(12) United States Patent
Lee et al.

(10) Patent No.: US 10,191,664 B2
(45) Date of Patent: Jan. 29, 2019

(54) MEMORY SYSTEM

(71) Applicant: SK hynix Inc., Gyeonggi-do (KR)

(72) Inventors: Yong-Woo Lee, Gyeonggi-do (KR);
Min-Chang Kim, Gyeonggi-do (KR);
Chang-Hyun Kim, Gyeonggi-do (KR);
Do-Yun Lee, Gyeonggi-do (KR);
Jae-Jin Lee, Gyeonggi-do (KR);
Hun-Sam Jung, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 102 days.

(21) Appl. No.: 15/294,255

(22) Filed: Oct. 14, 2016

(65) Prior Publication Data
US 2017/0109075 A1 Apr. 20, 2017

Related U.S. Application Data

(60) Provisional application No. 62/242,831, filed on Oct. 16, 2015.

(51) Int. Cl.
G06F 3/06 (2006.01)
G06F 12/0802 (2016.01)
G06F 12/08 (2016.01)
G06F 12/10 (2016.01)
G06F 12/0804 (2016.01)
G06F 13/16 (2006.01)

(52) U.S. Cl.
CPC .......... *G06F 3/0611* (2013.01); *G06F 3/0622* (2013.01); *G06F 3/0626* (2013.01); *G06F 3/0655* (2013.01); *G06F 3/0656* (2013.01); *G06F 3/0659* (2013.01); *G06F 3/0679* (2013.01); *G06F 3/0685* (2013.01); *G06F 12/08* (2013.01); *G06F 12/0802* (2013.01); *G06F 12/10* (2013.01); *G06F 12/0804* (2013.01); *G06F 13/1657* (2013.01); *G06F 2212/1016* (2013.01); *G06F 2212/60* (2013.01)

(58) Field of Classification Search
CPC .... G06F 3/0685; G06F 3/0659; G06F 3/0679; G06F 3/0655; G06F 12/0246; G06F 12/0868; G06F 12/0811; G06F 12/0897; G06F 2212/621; G06F 2212/7203; G06F 3/0611; G06F 3/0626; G06F 3/0622; G06F 3/0656; G06F 12/08; G06F 12/0802; G06F 12/10; G06F 12/0804; G06F 2212/60; G06F 2212/1016; G06F 13/1657

See application file for complete search history.

(56) References Cited

U.S. PATENT DOCUMENTS

| 7,010,570 | B1 * | 3/2006 | Boies ................ G06Q 30/018 705/317 |
| 9,317,429 | B2 | 4/2016 | Ramanujan et al. |
| 9,342,453 | B2 | 5/2016 | Nale et al. |
| 2009/0178043 | A1 * | 7/2009 | Prasanna .......... G06F 15/17375 718/102 |

(Continued)

Primary Examiner — Hiep T Nguyen
(74) Attorney, Agent, or Firm — IP & T Group LLP

(57) ABSTRACT

A memory system includes: a first memory device including a first memory and a first memory controller suitable for controlling the first memory to store data; a second memory device including a second memory and a second memory controller suitable for controlling the second memory to store data; and a processor suitable for executing an operating system (OS) and an application to access a data storage memory through the first and second memory devices.

18 Claims, 5 Drawing Sheets

(56) References Cited

U.S. PATENT DOCUMENTS

| | | | | |
|---|---|---|---|---|
| 2013/0054896 A1* | 2/2013 | Colavin | ............... | G06F 12/084 |
| | | | | 711/118 |
| 2013/0185609 A1* | 7/2013 | Park | ................... | G06F 11/0751 |
| | | | | 714/746 |
| 2014/0376306 A1* | 12/2014 | Bedeschi | .......... | G11C 13/0004 |
| | | | | 365/163 |
| 2015/0293774 A1* | 10/2015 | Persson | .............. | G06F 9/45558 |
| | | | | 718/1 |
| 2016/0179375 A1* | 6/2016 | Kirvan | ................. | G06F 3/0685 |
| | | | | 711/153 |

\* cited by examiner

MEMORY SYSTEM

CROSS-REFERENCE TO RELATED APPLICATION

The present application claims priority under 35 U.S.C § 119(e) to U.S. Provisional Application No. 62/242,831 filed on Oct. 16, 2015, which is incorporated herein by reference in its entirety.

BACKGROUND

1. Field

Various embodiments relate to a memory system and, more particularly, a memory system including plural heterogeneous memories having different latencies.

2. Description of the Related Art

In conventional computer systems, a system memory, a main memory, a primary memory, or an executable memory is typically implemented by the dynamic random access memory (DRAM). The DRAM-based memory consumes power even when no memory read operation or memory write operation is performed to the DRAM-based memory. This is because the DRAM-based memory should constantly recharge capacitors included therein. The DRAM-based memory is volatile, and thus data stored in the DRAM-based memory is lost upon removal of the power.

Conventional computer systems typically include multiple levels of caches to improve performance thereof. A cache is a high speed memory provided between a processor and a system memory in the computer system to perform an access operation to the system memory faster than the system memory itself in response to memory access requests provided from the processor. Such cache is typically implemented with a static random access memory (SRAM). The most frequently accessed data and instructions are stored within one of the levels of cache, thereby reducing the lumber of memory access transactions and improving performance.

Conventional mass storage devices, secondary storage devices or disk storage devices typically include one or more of magnetic media (e.g., hard disk drives), optical media (e.g., compact disc (CD) drive, digital versatile disc (DVD), etc.), holographic media, and mass-storage flash memory (e.g., solid state drives (SSDs) removable flash drives, etc.). These storage devices are Input/Output (I/O) devices because they are accessed by the processor through various I/O adapters that implement various I/O protocols, Portable or mobile devices (e.g., laptops, netbooks, tablet computers, personal digital assistant (PDAs), portable media players, portable gaming devices, digital cameras, mobile phones, smartphones, feature phones, etc.) may include removable mass storage devices (e.g., Embedded Multimedia Card (eMMC), Secure Digital (SD) card) that are typically coupled to the processor via low-power interconnects and I/O controllers.

A conventional computer system typically uses flash memory devices allowed only to store data and not to change the stored data in order to store persistent system information. For example, initial instructions such as the basic input and output system (BIOS) images executed by the processor to initialize key system components during the boot process are typically stored in the flash memory device. In order to speed up the BIOS execution speed, conventional processors generally cache a portion of the BIOS code during the pre-extensible firmware interface (PEI) phase of the boot process.

Conventional computing systems and devices include the system memory or the main memory, consisting of the DRAM, to store a subset of the contents of system non-volatile disk storage. The main memory reduces latency and increases bandwidth for the processor to store and retrieve memory operands from the disk storage.

The DRAM packages such as the dual in-line memory modules (DIMMs) are limited in terms of their memory density, and are also typically expensive with respect to the non-volatile memory storage. Currently, the main memory requires multiple DIMMs to increase the storage capacity thereof, which increases the cost and volume of the system. Increasing the volume of a system adversely affects the form factor of the system. For example, large DIMM memory ranks are not ideal in the mobile client space. What is needed is an efficient main memory system wherein increasing capacity does not adversely affect the form factor of the host system.

SUMMARY

Various embodiments of the present invention are directed to a memory system including plural heterogeneous memories having different latencies.

In accordance with an embodiment of the present invention, a memory system may include: a first memory device including a first memory and a first memory controller suitable for controlling the first memory to store data; a second memory device including a second memory and a second memory controller suitable for controlling the second memory to store data and a processor suitable for executing an operating system (OS) and an application to access a data storage memory through the first and second memory devices. The first and second memories may be separated from the processor. The second memory controller may transfer a signal between the processor and the second memory device based on at least one of a value of a handshaking information field included in the signal. The first memory may include a plurality of first high-capacity memory cores suitable for working as cache memories for the second memory. The first memory device may further include a first memory management logic communicatively and commonly coupled with the plurality of first high-capacity memory cores, and suitable for supporting high-speed data communication between the processor and the plurality of first high-capacity memory cores. The second memory may include a plurality of second high-capacity memory cores. The second memory device may further include a second memory management logic communicatively and commonly coupled with the plurality of second high-capacity memory cores, and suitable for supporting data communication between the processor and the plurality of second high-capacity memory cores. The second memory management logic may include a buffer suitable for buffering write data to update the plurality of second memory cores. The second memory management logic may firstly buffer the write data in the buffer, and then independently update the plurality of second memory cores based on the buffered write data.

In accordance with an embodiment of the present invention, a memory system may include; a first memory device including a first memory and a first memory controller suitable for controlling the first memory to store data; a second memory device including a second memory and a second memory controller suitable for controlling the second memory to store data; and a processor suitable for accessing the first and second memory. The second memory controller may transfer a signal between the processor and the second memory device based on at least one of a value of a handshaking information field included in the signal. The first memory may include a plurality of first high-capacity memory cores suitable for working as cache memories for the second memory. The first memory device may further include a first memory management logic communicatively and commonly coupled with the plurality of first high-capacity memory cores, and suitable for supporting high-speed data communication between the processor and the plurality of first high-capacity memory cores. The second memory may include a plurality of second high-capacity memory cores. The second memory device may further include a second memory management logic communicatively and commonly coupled with the plurality of second high-capacity memory cores, and suitable for supporting data communication between the processor and the plurality of second high-capacity memory cores. The second memory management logic may include a buffer suitable for buffering write data to update the plurality of second memory cores. The second memory management logic may firstly buffer the write data in the buffer, and then independently update the plurality of second memory cores based on the buffered write data.

DETAILED DESCRIPTION

Figure 1:
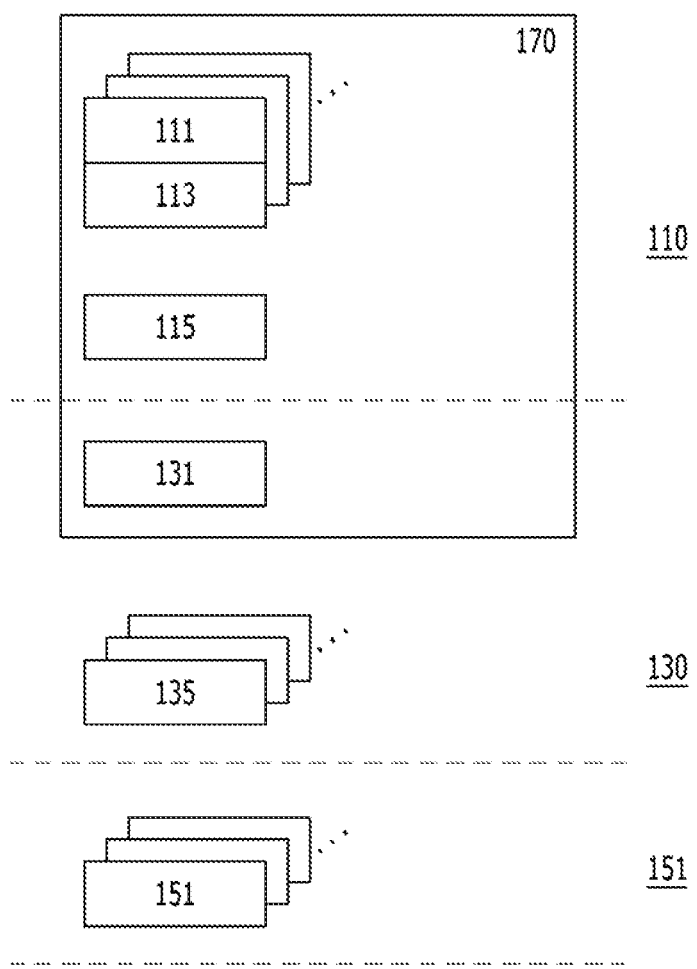
FIG. 1 is a block diagram schematically illustrating a structure of caches and a system memory according to an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete and will fully convey the scope of the present invention to those skilled in the art. The drawings are not necessarily to scale and in some instances, proportions may have been exaggerated to clearly illustrate features of the embodiments. Throughout the disclosure, reference numerals correspond directly to like parts in the various figures and embodiments of the present invention. It is also noted that in this specification, "connected/coupled" refers to one component not only directly coupling another component but also indirectly coupling another component through an intermediate component. In addition, a singular form may include a plural form as long as it is not specifically mentioned in a sentence. It should be readily understood that the meaning of "on" and "over" in the present disclosure should be interpreted in the broadest manner such that "on" means not only "directly on" but also "on" something with an intermediate feature(s) or a layer(s) therebetween, and that "over" means not only directly on top but also on top of something with an intermediate feature(s) or a layer(s) therebetween. When a first layer is referred to as being "on" a second layer or "on" a substrate, it not only refers to a case in which the first layer is formed directly on the second layer or the substrate but also a case in which a third layer exists between the first layer and the second layer or the substrate.

FIG. 1 is a block diagram schematically illustrating a structure of caches and a system memory according to an embodiment of the present invention.

Figure 2:
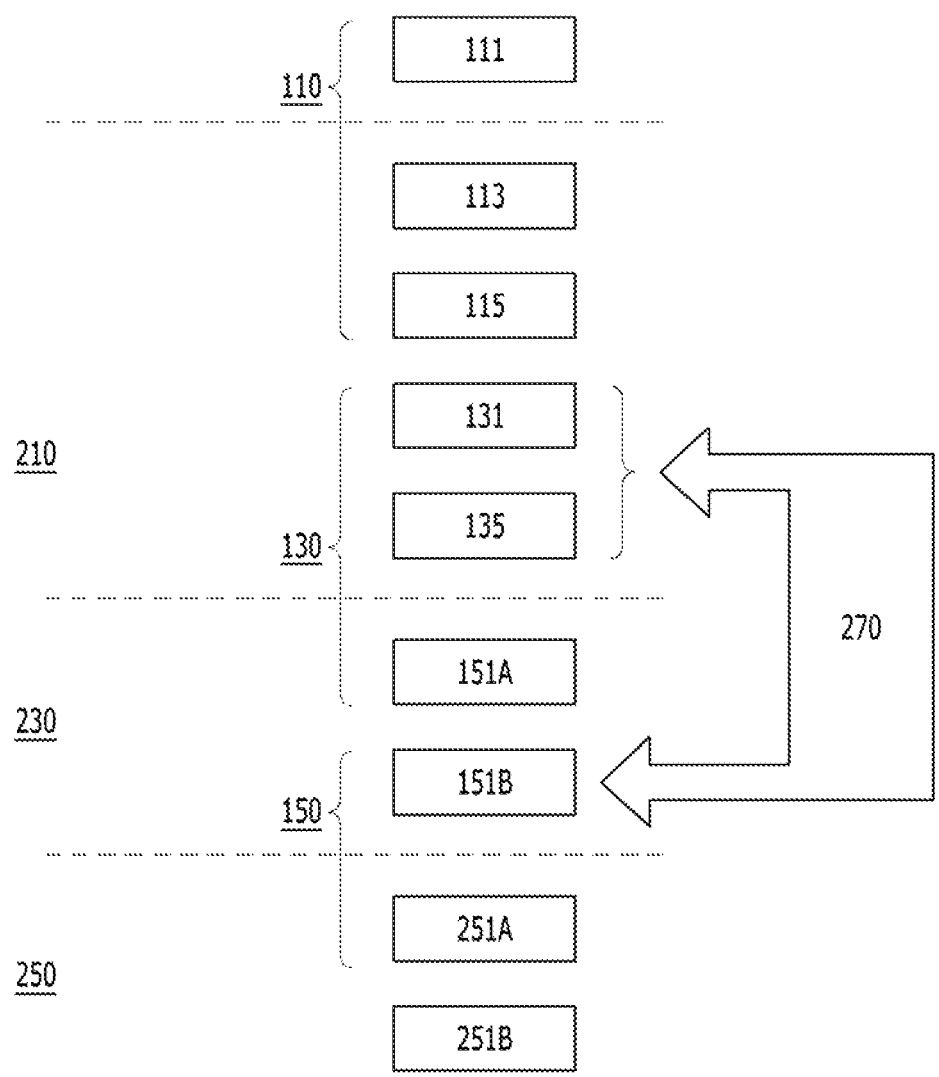
FIG. 2 is a block diagram schematically illustrating a hierarchy of cache—system memory—mass storage according to an embodiment of the present invention.

FIG. 2 is a block diagram schematically illustrating a hierarchy of cache—system memory mass—storage according to an embodiment of the present invention, Referring to FIG. 1, the caches and the system memory may include a processor cache 110, an internal memory cache 131 an external memory cache 135 and a system memory 151. The internal and external memory caches 131 and 135 may be implemented with a first memory 130 (see FIG. 3), and the system memory 151 may be implemented with one or more of the first memory 130 and a second memory 150 (see FIG. 3).

For example, the first memory 130 may be volatile and may be the DRAM.

For example, the second memory 150 may be non-volatile and may be one or more of the NAND flash memory, the NOR flash memory and a non-volatile random access memory (NVRAM). Even though the second memory 150 may be exemplarily implemented with the NVRAM, the second memory 150 will not be limited to a particular type of memory device.

The NVRAM may include one or more of the ferroelectric random access memory (FRAM) using a ferroelectric capacitor, the magnetic random access memory (MRAM) using the tunneling magneto-resistive (TMR) layer, the phase change random access memory (PRAM) using a chalcogenide alloy, the resistive random access memory (RERAM) using a transition metal oxide, the spin transfer torque random access memory (STT-RAM), and the like.

Unlike a volatile memory, the NVRAM may maintain its content despite removal of the power. The NVRAM may also consume less power than a DRAM. The NVRAM may be of random access. The NVRAM may be accessed at a lower level of granularity (e.g., byte level) than the flash memory. The NVRAM may be coupled to a processor 170 over a bus, and may be accessed at a level of granularity small enough to support operation of the NVRAM as the system memory (e.g., cache line size such as 64 or 128 bytes). For example, the bus between the NVRAM and the processor 170 may be a transactional memory bus (e.g., a DDR bus such as DDR3, DDR4, etc.). As another example, the bus between the NVRAM and the processor 170 may be a transactional bus including one or more of the PCI express (PCIE) bus and the desktop management interface (DMI) bus, or any other type of transactional bus of a small-enough transaction payload size (e.g., cache line size such as 64 or 128 bytes). The NVRAM may have faster access speed than other non-volatile memories, may be directly writable rather than requiring erasing before writing data, and may be more re-writable than the flash memory.

The level of granularity at which, the NVRAM is accessed may depend on a particular memory controller and a particular bus to which the NVRAM is coupled. For example, in some implementations where the NVRAM works as a system memory, the NVRAM may be accessed at the granularity of a cache line (e.g. a 64-byte or 128-Byte cache line), at which a memory sub-system including the internal and external memory caches 131 and 135 and the system memory 151 accesses a memory. Thus, when the NVRAM is deployed as the system memory 151 within the memory sub-system, the NVRAM may be accessed at the same level of granularity as the first memory 130 (e.g., the DRAM) included in the same memory sub-system. Even so, the level of granularity of access to the NVRAM by the memory controller and memory bus or other type of bus is smaller than that of the block size used by the flash memory and the access size of the I/O subsystem's controller and bus.

The NVRAM may be subject to the wear leveling operation due to the fact that storage cells thereof begin to wear out after a number of write operations. Since high cycle count blocks are most likely to wear out faster, the wear leveling operation may swap addresses between the high cycle count blocks and the low cycle count blocks to level out memory cell utilization. Most address swapping may be transparent to application programs because the swapping is handled by one or more of hardware and lower-level software (e.g., a low level driver or operating system).

The phase-change memory (PCM) or the phase change random access memory (PRAM or PCRAM) as an example of the NVRAM is a non-volatile memory using the chalcogenide glass. As a result of heat produced by the passage of an electric current, the chalcogenide glass can be switched between a crystalline state and an amorphous state. Recently the PRAM may have two additional distinct states. The PRAM may provide higher performance than the flash memory because a memory element of the PRAM can be switched more quickly the write operation changing individual bits to either "1" or "0" can be done without the need to firstly erase an entire block of cells, and degradation caused by the write operation is slower. The PRAM device may survive approximately 100 million write cycles.

For example, the second memory 150 may be different from the SRAM, which may be employed for dedicated processor caches 113 respectively dedicated to the processor cores 111 and for a processor common cache 115 shared by the processor cores 111; the DRAM configured as one or more of the internal memory cache 131 internal to the processor 170 (e.g., on the same die as the processor 170) and the external memory cache 135 external to the processor 170 (e.g., in the same or a different package from the processor 170); the flash memory/magnetic disk/optical disc applied as the mass storage (not shown); and a memory (not shown) such as the flash memory or other read only memory (ROM) working as a firmware memory, which can refer to boot ROM and BIOS Flash.

The second memory 150 may work as instruction and data storage that is addressable by the processor 170 either directly or via the first memory 130. The second memory 150 may also keep pace with the processor 170 at least to a sufficient extent in contrast to a mass storage 251B. The second memory 150 may be placed on the memory bus, and may communicate directly with a memory controller and the processor 170.

The second memory 150 may be combined with other instruction and data storage technologies (e.g., DRAM) to form hybrid memories, such as, for example, the Co-locating PRAM and DRAM, the first level memory and the second level memory, and the FLAM (i.e., flash and DRAM).

At least a part of the second memory 150 may work as mass storage instead of, or in addition to, the system memory 151. When the second memory 150 serves as a mass storage 251A, the second memory 150 serving as the mass storage 251A need not be random accessible, byte addressable or directly addressable by the processor 170.

The first memory 130 may be an intermediate level of memory that has lower access latency relative to the second memory 150 and/or more symmetric access latency (i.e., having read operation times which are roughly equivalent to write operation times). For example, the first memory 130 may be a volatile memory such as volatile random access memory (VRAM) and may comprise the DRAM or other high speed capacitor-based memory. However, the underlying principles of the invention will not be limited to these specific memory types. The first memory 130 may have a relatively lower density. The first memory 130 may be more expensive to manufacture than the second memory 150.

In one embodiment, the first memory 130 may be provided between the second memory 150 and the processor cache 110. For example, the first memory 130 may be configured as one or more external memory caches 135 to mask the performance and/or usage limitations of the second memory 150 including, for example, read/write latency limitations and memory degradation limitations. The combination of the external memory cache 135 and the second memory 150 as the system memory 151 may operate at a performance level which approximates is equivalent or exceeds a system which uses only the DRAM as the system memory 151.

The first memory 130 as the intern& memory cache 131 may be located on the same die as the processor 170. The first memory 130 as the external memory cache 135 may be located external to the die of the processor 170. For example, the first memory 130 as the external memory cache 135 may be located on a separate die located on a CPU package, or located on a separate die outside the CPU package with a high bandwidth link to the CPU package. For example, the first memory 130 as the external memory cache 135 may be located on a dual in-line memory module (DIMM), a riser/mezzanine, or a computer motherboard. The first memory 130 may be coupled in communication with the processor 170 through a single or multiple high bandwidth links, such as the DDR or other transactional high bandwidth links.

FIG. 1 illustrates how various levels of caches 113, 115, 131 and 135 may be configured with respect to a system physical address (SPA) space in a system according to an embodiment of the present invention. As illustrated in FIG. 1, the processor 170 may include one or more processor cores 111, with each core having its own internal memory cache 131. Also, the processor 170 may include the processor common cache 115 shared by the processor cores 111. The operation of these various cache levels are well understood in the relevant art and will not be described in detail here.

For example, one of the external memory caches 135 may correspond to one of the system memories 151, and serve as the cache for the corresponding system memory 151. For example, some of the external memory caches 135 may correspond to one of the system memories 151, and serve as the caches for the corresponding system memory 151. In some embodiments, the caches 113, 115 and 131 provided within the processor 170 may perform caching operations for the entire SPA space.

The system memory 151 may be visible to and/or directly addressable by software executed on the processor 170. The cache memories 113, 115, 131 and 135 may operate transparently to the software in the sense that they do not form a directly-addressable portion of the SPA space while the processor cores 111 may support execution of instructions to allow software to provide some control (configuration, policies, hints, etc.) to some or all of the cache memories 113, 115, 131 and 135.

The subdivision into the plural system memories 151 may be performed manually as part of a system configuration process (e.g., by a system designer) and/or may be performed automatically by software.

In one embodiment, the system memory 151 may be implemented with one or more of the non-volatile memory (e.g., PRAM) used as the second memory 150, and the volatile memory (e.g., DRAM) used as the first memory 130. The system memory 151 implemented with the volatile memory may be directly addressable by the processor 170 without the first memory 130 serving as the memory caches 131 and 135.

FIG. 2 illustrates the hierarchy of cache—system memory—mass storage by the first and second memories 130 and 150 and various possible operation modes for the first and second memories 130 and 150.

The hierarchy of cache—system memory—mass storage may comprise a cache level 210, a system memory level 230 and a mass storage level 250, and additionally comprise a firmware memory level (not illustrated).

The cache level 210 may include the dedicated processor caches 113 and the processor common cache 115, which are the processor cache. Additionally, when the first memory 130 serves in a cache mode for the second memory 150 working as the system memory 151B, the cache level 210 may further include the internal memory cache 131 and the external memory cache 135.

The system memory level 230 may include the system memory 151B implemented with the second memory 150. Additionally, when the first memory 130 serves in a system memory mode, the system memory level 230 may further include the first memory 130 working as the system memory 151A.

The mass storage level 250 may include one or more of the flash/magnetic/optical mass storage 251B and the mass storage 215A implemented with the second memory 150.

Further the firmware memory level may include the BIOS flash (not illustrated) and the BIOS memory implemented with the second memory 150.

The first memory 130 may serve as the caches 131 and 135 for the second memory 150 working as the system memory 151B in the cache mode. Further, the first memory 130 may serve as the system memory 151A and occupy a portion of the SPA space in the system memory mode.

The first memory 130 may be partitionable, wherein each partition may independently operate in a different one of the cache mode and the system memory mode. Each partition may alternately operate between the cache mode and the system memory mode. The partitions and the corresponding modes may be supported by one or more of hardware, firmware, and software. For example, sizes of the partitions and the corresponding modes may be supported by a set of programmable range registers capable of identifying each partition and each mode within a memory cache controller 270.

When the first memory 130 serves in the cache mode for the system memory 151B, the SPA space may be allocated not to the first memory 130 working as the memory caches 131 and 135 but to the second memory 150 working as the system memory 151B. When the first memory 130 serves in the system memory mode, the SPA space may be allocated to the first memory 130 working as the system memory 151A and the second memory 150 working as the system memory 151B.

When the first memory 130 serves in the cache mode for the system memory 151B, the first memory 130 working as the memory caches 131 and 135 may operate in various sub-modes under the control of the memory cache controller 270. In each of the sub-modes, a memory space of the first memory 130 may be transparent to software in the sense that the first memory 130 does not form a directly-addressable portion of the SPA space. When the first memory 130 serves in the cache mode, the sub-modes may include but may not be limited as of the following table 1.

TABLE 1

| MODE | READ OPERATION | WRITE OPERATION |
| --- | --- | --- |
| Write-Back Cache | Allocate on Cache Miss Write-Back on Evict of Dirty Data | Allocate on Cache Miss Write-Back on Evict of Dirty Data |
| $1^{st}$ Memory Bypass | Bypass to $2^{nd}$ Memory | Bypass to $2^{nd}$ Memory |
| $1^{st}$ Memory Read-Cache & Write-Bypass | Allocate on Cache Miss | Bypass to $2^{nd}$ Memory Cache Line Invalidation |
| $1^{st}$ Memory Read-Cache & Write-Through | Allocate on Cache Miss | Update Only on Cache Hit Write-Through to $2^{nd}$ Memory |

During the write-back cache mode, part of the first memory 130 may work as the caches 131 and 135 for the second memory 150 working as the system memory 151B. During the write-back cache mode, every write operation is directed initially to the first memory 130 working as the memory caches 131 and 135 when a cache line, to which the write operation is directed, is present in the caches 131 and 135. A corresponding write operation is performed to update the second memory 150 working as the system memory 151B only when the cache line within the first memory 130 working as the memory caches 131 and 135 is to be replaced by another cache line.

During the first memory bypass mode, all read and write operations bypass the first memory 130 working as the memory caches 131 and 135 and are performed directly to the second memory 150 working as the system memory 151B. For example, the first memory bypass mode may be activated when an application is not cache-friendly or requires data to be processed at the granularity of a cache lines. In one embodiment, the processor caches 113 and 115 and the first memory 130 working as the memory caches 131 and 135 may perform the caching operation independently from each other consequently the first memory 130 working as the memory caches 131 and 135 may cache data, which is not cached or required not to be cached in the processor caches 113 and 115, and vice versa. Thus, certain data required not to be cached in the processor caches 113 and 115 may be cached within the first memory 130 working as the memory caches 131 and 135.

During the first memory read-cache and write-bypass mode, a read caching operation to data from the second memory 150 working as the system memory 151B may be allowed. The data of the second memory 150 working as the system memory 151B may be cached in the first memory 130 working as the memory caches 131 and 135 for read-only operations. The first memory read-cache and write-bypass mode may be useful in the case that most data of the second memory 150 working as the system memory 151B is "read only" and the application usage is cache-friendly.

The first memory read-cache and write-through mode may be considered as a variation of the first memory read-cache and write-bypass mode. During the first memory read-cache and write-through mode, the write-hit may also be cached as well as the read caching. Every write operation to the first memory 130 working as the memory caches 131 and 135 may cause a write operation to the second memory 150 working as the system memory 151B. Thus, due to the write-through nature of the cache, cache-line persistence may be still guaranteed.

When the first memory 130 works as the system memory 151A, all or parts of the first memory 130 working as the system memory 151A may be directly visible to an application and may form part of the SPA space. The first memory 130 working as the system memory 151A may be completely under the control of the application. Such scheme may create the non-uniform memory address (NUMA) memory domain where an application gets higher performance from the first memory 130 working as the system memory 151A relative to the second memory 150 working as the system memory 151B. For example, the first memory 130 working as the system memory 151A may be used for the high performance computing (HPC) and graphics applications which require very fast access to certain data structures.

In an alternative embodiment, the system memory mode of the first memory 130 may be implemented by pinning certain cache lines in the first memory 130 working as the system memory 151A, wherein the cache lines have data also concurrently stored in the second memory 150 working as the system memory 151B.

Although not illustrated, parts of the second memory 150 may be used as the firmware memory. For example, the parts of the second memory 150 may be used to store BIOS images instead of or in addition to storing the BIOS information in the BIOS flash. In this case, the parts of the second memory 150 working as the firmware memory may be a part of the SPA space and may be directly addressable by an application executed on the processor cores 111 while the BIOS flash may be addressable through an I/O sub-system 320.

To sum up, the second memory 150 may serve as one or more of the mass storage 215A and the system memory 151B. When the second memory 150 serves as the system memory 151B and the first memory 130 serves as the system memory 151A, the second memory 150 working as the system memory 151B may be coupled directly to the processor caches 113 and 115. When the second memory 150 serves as the system memory 151B but the first memory 130 serves as the cache memories 131 and 135, the second memory 150 working as the system memory 151B may be coupled to the processor caches 113 and 115 through the first memory 130 working as the memory caches 131 and 135. Also, the second memory 150 may serve as the firmware memory for storing the BIOS images.

Figure 3:
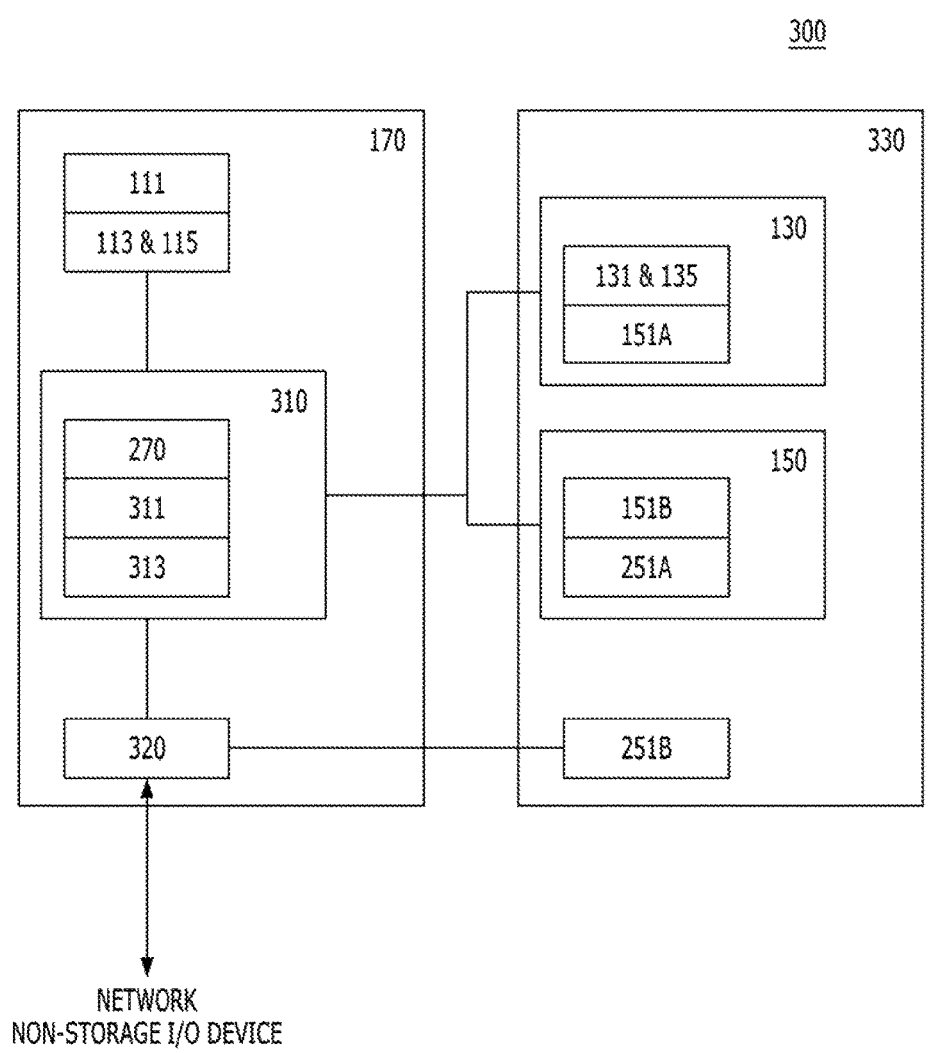
FIG. 3 is a block diagram illustrating a computer system according to an embodiment of the present invention.

FIG. 3 is a block diagram illustrating a computer system 300 according to an embodiment of the present invention.

The computer system 300 may include the processor 170 and a memory and storage sub-system 330.

The memory and storage sub-system 330 may include the first memory 130, the second memory 150, and the flash/magnetic/optical mass storage 251B. The first memory 130 may include one or more of the cache memories 131 and 135 working in the cache mode and the system memory 151A working in the system memory mode. The second memory 150 may include the system memory 151B, and may further include the mass storage 251A as an option.

In one embodiment, the NVRAM may be adopted to configure the second memory 150 including the system memory 151B, and the mass storage 251A for the computer system 300 for storing data instructions, states, and other persistent and non-persistent information.

Referring to FIG. 3, the second memory 150 may be partitioned into the system memory 151B and the mass storage 251A, and additionally the firmware memory as an option.

For example, the first memory 130 working as the memory caches 131 and 135 may operate as follows during the write-back cache mode.

The memory cache controller 270 may perform the look-up operation in order to determine whether the read-requested data is cached in the first memory 130 working as the memory caches 131 and 135.

When the read-requested data is cached in the first memory 130 working as the memory caches 131 and 135, the memory cache controller 270 may return the read-requested data from the first memory 130 working as the memory caches 131 and 135 to a read requestor (e.g., the processor cores 111).

When the read-requested data is not cached in the first memory 130 working as the memory caches 131 and 135, the memory cache controller 270 may provide a second memory controller 311 with the data read request and a system memory address. The second memory controller 311 may use a decode table 313 to translate the system memory address to a physical device address (PDA) of the second memory 150 working as the system memory 151B, and may direct the read operation to the corresponding region of the second memory 150 working as the system memory 151B. In one embodiment, the decode table 313 may be used for the second memory controller 311 to translate the system memory address to the PDA of the second memory 150 working as the system memory 151B, and may be updated as part of the wear leveling operation to the second memory 150 working as the system memory 151B. Alternatively a part of the decode table 313 may be stored within the second memory controller 311.

Upon receiving the requested data from the second memory 150 working as the system memory 151B, the second memory controller 311 may return the requested data to the memory cache controller 270, the memory cache controller 270 may store the returned data in the first memory 130 working as the memory caches 131 and 135 and may also provide the returned data to the read requester. Subsequent requests for the returned data may be handled directly from the first memory 130 working as the memory caches 131 and 135 until the returned data is replaced by another data provided from the second memory 150 working as the system memory 151B.

During the write-back cache mode when the first memory 130 works as the memory caches 131 and 135, the memory cache controller 270 may perform the look-up operation in order to determine whether the write-requested data is cached in the first memory 130 working as the memory caches 131 and 135. During the write-back cache mode, the write-requested data may not be provided directly to the second memory 150 working as the system memory 151B For example, the previously write-requested and currently cached data may be provided to the second memory 150 working as the system memory 151B only when the location of the previously write-requested data currently cached in first memory 130 working as the memory caches 131 and 135 should be re-used for caching another data corresponding to a different system memory address. In this case, the memory cache controller 270 may determine that the previously write-requested data currently cached in the first memory 130 working as the memory caches 131 and 135 is currently not in the second memory 150 working as the system memory 151B, and thus may retrieve the currently cached data from first memory 130 working as the memory caches 131 and 135 and provide the retrieved data to the second memory controller 311. The second memory controller 311 may look up the PDA of the second memory 150 working as the system memory 151B for the system memory address, and then may store the retrieved data into the second memory 150 working as the system memory 151B.

The coupling relationship among the second memory controller 311 and the first and second memories 130 and 150 of FIG. 3 may not necessarily indicate particular physical bus or particular communication channel. In some embodiments, a common memory bus or other type of bus may be used to communicatively couple the second memory controller 311 to the second memory 150. For example, in one embodiment, the coupling relationship between the second memory controller 311 and the second memory 150 of FIG. 3 may represent the DDR-typed bus, over which the second memory controller 311 communicates with the second memory 150. The second memory controller 311 may also communicate with the second memory 150 over a bus supporting a native transactional protocol such as the PCIE bus, the DMI bus, or any other type of bus utilizing a transactional protocol and a small-enough transaction payload size (e.g., cache line size such as 64 or 128 bytes)

In one embodiment, the computer system 300 may include an integrated memory controller 310 suitable for performing a central memory access control for the processor 170. The integrated memory controller 310 may include the memory cache controller 270 suitable for performing a memory access control to the first memory 130 working as the memory caches 131 and 135, and the second memory controller 311 suitable for performing a memory access control to the second memory 150.

In the illustrated embodiment, the memory cache controller 270 may include a set of mode setting information which specifies various operation mode (e.g., the write-back cache mode, the first memory bypass mode etc.) of the first memory 130 working as the memory caches 131 and 135 for the second memory 150 working as the system memory 151B. In response to a memory access request, the memory cache controller 270 may determine whether the memory access request may be handled from the first memory 130 working as the memory caches 131 and 135 or whether the memory access request is to be provided to the second memory controller 311, which may then handle the memory access request from the second memory 150 working as the system memory 151B.

In an embodiment where the second memory 150 is implemented with PRAM, the second memory controller 311 may be a PRAM controller. Despite that the PRAM is inherently capable of being accessed at the granularity of bytes, the second memory controller 311 may access the PRAM-based second memory 150 at a lower level of granularity such as a cache line (e.g., a 64-bit or 128-bit cache line) or any other level of granularity consistent with the memory sub-system. When PRAM-based second memory 150 is used to form a part of the SPA space, the level of granularity may be higher than that traditionally used for other non-volatile storage technologies such as the flash memory, which may only perform the rewrite and erase operations at the level of a block (e.g., 64 Kbytes in size for the NOR flash memory and 16 Kbytes for the NAND flash memory).

In the illustrated embodiment, the second memory controller 311 may read configuration data from the decode table 313 in order to establish the above described partitioning and modes for the second memory 150. For example, the computer system 300 may program the decode table 313 to partition the second memory 150 into the system memory 151B and the mass storage 251A. An access means may access different partitions of the second memory 150 through the decode table 313. For example, an address range of each partition is defined in the decode table 333.

In one embodiment, when the integrated memory controller 310 receives an access request, a target address of the access request may be decoded to determine whether the request is directed toward the system memory 151B, the mass storage 251A, or I/O devices.

When the access request is a memory access request, the memory cache controller 270 may further determine from the target address whether the memory access request is directed to the first memory 130 working as the memory caches 131 and 135 or to the second memory 150 working as the system memory 151B. For the access to the second memory 150 working as the system memory 151B, the memory access request may be forwarded to the second memory controller 311.

The integrated memory controller 310 may pass the access request to the I/O sub-system 320 when the access request is directed to the I/O device. The I/O sub-system 320 may further decode the target address to determine whether the target address points to the mass storage 251A of the second memory 150, the firmware memory of the second memory 150, or other non-storage or storage I/O devices. When the further decoded address points to the mass storage 251A or the firmware memory of the second memory 150, the I/O sub-system 320 may forward the access request to the second memory controller 311.

The second memory 150 may act as replacement supplement for the traditional DRAM technology in the system memory. In one embodiment, the second memory 150 working as the system memory 151B along with the first memory 130 working as the memory caches 131 and 135 may represent a two-level system memory. For example, the two-level system memory may include a first-level system memory comprising the first memory 130 working as the memory caches 131 and 135 and a second-level system memory comprising the second memory 150 working as the system memory 151B.

According to some embodiments, the mass storage 251A implemented with the second memory 150 may act as replacement or supplement for the flash/magnetic/optical mass storage 251B. In some embodiments, even though the second memory 150 is capable of byte-level addressability, the second memory controller 311 may still access the mass storage 251A implemented with the second memory 150 by units of blocks of multiple bytes (e.g. 64 Kbytes, 128 Kbytes, and so forth). The access to the mass storage 251A implemented with the second memory 150 by the second memory controller 311 may be transparent to an application executed by the processor 170. For example, even though the mass storage 251A implemented with the second memory 150 is accessed differently from the flash/magnetic/optical mass storage 251B, the operating system may still treat the mass storage 251A implemented with the second memory 150 as a standard mass storage device (e.g., a serial ATA hard drive or other standard form of mass storage device).

In an embodiment where the mass storage 251A implemented with the second memory 150 acts as replacement or supplement for the flash/magnetic/optical mass storage 251B, it may not be necessary to use storage drivers for block-addressable storage access. The removal of the storage driver overhead from the storage access may increase access speed and may save power. In alternative embodiments where the mass storage 251A implemented with the second memory 150 appears as block-accessible to the OS and/or applications and indistinguishable from the flash/magnetic/optical mass storage 251B, block-accessible interfaces (e.g., Universal Serial Bus (USB), Serial Advanced Technology Attachment (SATA) and the like) may be exposed to the software through emulated storage drivers in order to access the mass storage 251A implemented with the second memory 150.

In some embodiments, the processor 170 may include the integrated memory controller 310 comprising the memory cache controller 270 and the second memory controller 311 all of which may be provided on the same chip as the processor 170, or on a separate chip and/or package connected to the processor 170.

In some embodiments, the processor 170 may include the I/O sub-system 320 coupled to the integrated memory controller 310. The I/O sub-system 320 may enable communication between processor 170 and one or more of networks such as the local area network (LAN), the wide area network (WAN) or the Internet; a storage I/O device such as the flash/magnetic/optical mass storage 251B and the BIOS flash; and one or more of non-storage I/O devices such as display, keyboard, speaker, and the like. The I/O sub-system 320 may be on the same chip as the processor 170, or on a separate chip and/or package connected to the processor 170.

The I/O sub-system 320 may translate a host communication protocol utilized within the processor 170 to a protocol compatible with particular I/O devices.

In the particular embodiment of FIG. 3, the memory cache controller 270 and the second memory controller 311 may be located on the same die or package as the processor 170. In other embodiments, one or more of the memory cache controller 270 and the second memory controller 311 may be located off-die or off-package, and may be coupled to the processor 170 or the package over a bus such as a memory bus such as the DDR bus the PCIE bus, the DMI bus, or any other type of bus.

Figure 4:
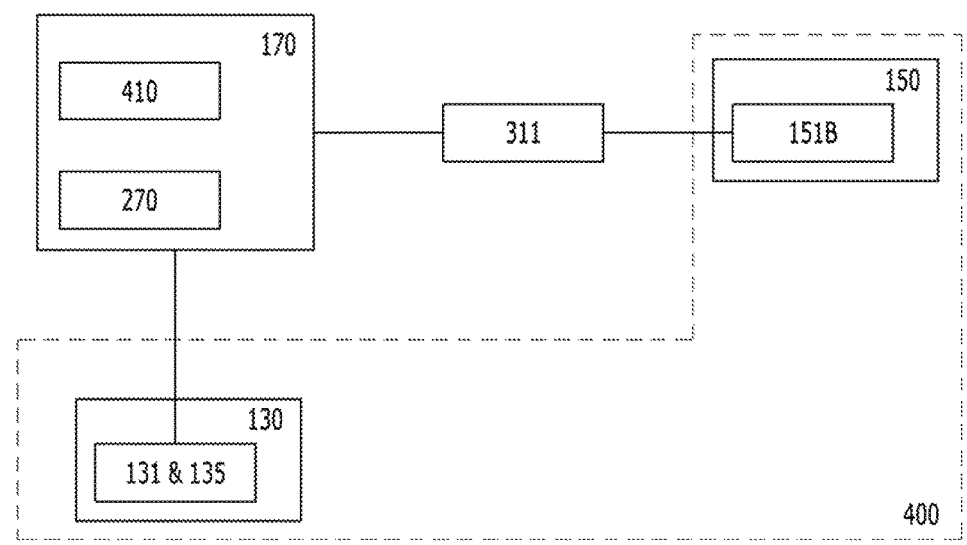
FIG. 4 is a block diagram illustrating a two-level memory sub-system according to an embodiment of the present invention.

FIG. 4 is a block diagram illustrating a two-level memory sub-system 400 according to an embodiment of the present invention.

Referring to FIG. 4, the two-level memory sub-system 400 may include the first memory 130 working as the memory caches 131 and 135 and the second memory 150 working as the system memory 151B. The two-level memory sub-system 400 may include a cached sub-set of the mass storage level 250 including run-time data. In an embodiment the first memory 130 included in the two-level memory sub-system 400 may be volatile and the DRAM. In an embodiment, the second memory 150 included in the two-level memory sub-system 400 may be non-volatile and one or more of the NAND flash memory, the NOR flash memory and the NVRAM. Even though the second memory 150 may be exemplarily implemented with the NVRAM, the second memory 150 will not be limited to a particular memory technology.

The second memory 150 may be presented as the system memory 151B to a host operating system (OS: not illustrated) while the first memory 130 works as the caches 131 and 135, which is transparent to the OS, for the second memory 150 working as the system memory 151B. The two-level memory sub-system 400 may be managed by a combination of logic and modules executed via the processor 170. In an embodiment, the first memory 130 may be coupled to the processor 170 through high bandwidth and low latency means for efficient processing. The second memory 150 may be coupled to the processor 170 through low bandwidth and high latency means.

The two-level memory sub-system 400 may provide the processor 170 with run-time data storage. The two-level memory sub-system 400 may provide the processor 170 with access to the contents of the mass storage level 250. The processor 170 may include the processor caches 113 and 115, which store a subset of the contents of the two-level memory sub-system 400.

The first memory 130 may be managed by the memory cache controller 270 while the second memory 150 may be managed by the second memory controller 311. In an embodiment, the memory cache controller 270 and the second memory controller 311 may be located on the same die or package as the processor 170. In other embodiments, one or more of the memory cache controller 270 and the second memory controller 311 may be located off-die or off-package, and may be coupled to the processor 170 or to the package over a bus such as a memory bus (e.g., the DDR bus), the PCIE bus, the DMI bus, or any other type of bus.

The second memory controller 311 may report the second memory 150 to the system OS as the system memory 151B. Therefore, the system OS may recognize the size of the second memory 150 as the size of the two-level memory sub-system 400. The system OS and system applications are unaware of the first memory 130 since the first memory 130 serves as the transparent caches 131 and 135 for the second memory 150 working as the system memory 151B.

The processor 170 may further include two-level management unit 410 The two-level management unit 410 may be a logical construct that may comprise one or more of hardware and micro-code extensions to support the two-level memory sub-system 400. For example, the two-level management unit 410 may maintain a full tag table that tracks the status of the second memory 150 working as the system memory 151B. For example, when the processor 170 attempts to access a specific data segment in the two-level memory sub-system 400 the two-level management unit 410 may determine whether the data segment is cached in the first memory 130 working as the caches 131 and 135. When the data segment is not cached in the first memory 130, the two-level management unit 410 may fetch the data segment from the second memory 150 working as the system memory 151B and subsequently may write the fetched data segment to the first memory 130 working as the caches 131 and 135. Because the first memory 130 works as the caches 131 and 135 for the second memory 150 working as the system memory 151B, the two-level management unit 410 may further execute data prefetching or similar cache efficiency processes known in the art.

The two-level management unit 410 may manage the second memory 150 working as the system memory 151B. For example, when the second memory 150 comprises the non-volatile memory, the two-level management unit 410 may perform various operations including wear-leveling, bad-block avoidance, and the like in a manner transparent to the system software.

As an exemplified process of the two-level memory sub-system 400, in response to a request for a data operand, it may be determined whether the data operand is cached in first memory 130 working as the memory caches 131 and 135. When the data operand is cached in first memory 130 working as the memory caches 131 and 135, the operand may be returned from the first memory 130 working as the memory caches 131 and 135 to a requestor of the data operand. When the data operand is not cached in first memory 130 working as the memory caches 131 and 135, it may be determined whether the data operand is stored in the second memory 150 working as the system memory 151B. When the data operand is stored in the second memory 150 working as the system memory 151B, the data operand may be cached from the second memory 150 working as the system memory 151B into the first memory 130 working as the memory caches 131 and 135 and then returned to the requestor of the data operand. When the data operand is not stored in the second memory 150 working as the system memory 151B, the data operand may be retrieved from the mass storage 250, cached into the second memory 150 working as the system memory 151B, cached into the first memory 130 working as the memory caches 131 and 135, and then returned to the requestor of the data operand.

In accordance with an embodiment of the present invention, signals exchanged between the processor 170 and a second memory unit, which includes the second memory controller 311 and the second memory 150 working as the system memory 151B, may include a handshaking information field as well as a memory access request field and a corresponding response field (e.g., the read command, the write command, the address, the data, the data strobe, and so forth).

The handshaking information field may be for the second memory unit, which includes the second memory controller 311 and the second memory 150 working as the system memory 151B, communicating with the processor 170 through the handshaking scheme, and therefore may be included in the signal exchanged between the processor 170 and the second memory unit, which includes the second memory controller 311 and the second memory 150 working as the system memory 151B. For example, the handshaking information field may have three values according to types of the signal between the processor 170 and the second memory unit (the second memory controller 311 and the second memory 150 working as the system memory 151B) as exemplified in the following table 2.

field of the value "11" representing transmission standby of the requested data, which is retrieved from the second memory unit in response to the read command and the read address included in the data request signal.

The session start signal may be provided from the processor 170 to the second memory unit in response to the data ready signal, and may have the handshaking information field of the value "01" representing reception start of the requested data ready to be transmitted in the second memory unit. For example the processor 170 may receive the requested data from the second memory unit after providing the session start signal to the second memory unit.

The processor 170 and the second memory controller 311 of the second memory unit may operate according to the signals between the processor 170 and the second memory unit by identifying the type of the signals based on the value of the handshaking information field.

Although not illustrated, the second memory controller 311 may further include a handshaking interface unit. The handshaking interface unit may receive the data request signal provided from the processor 170, which includes the memory cache controller 270, and having the value "10" of the handshaking information field, and allow the second memory controller 311 to operate according to the data request signal. Also, the handshaking interface unit may provide the processor 170 with the data ready signal having the value "01" of the handshaking information field in response to the data request signal from the processor 170.

As described above, the bus between the handshaking interface unit and the processor 170 may be a transactional bus including one or more of the PCIE bus and the DMI bus, or any other type of transactional bus of a mall-enough transaction payload size (e.g., cache line size such as 64 or 128 bytes). For example, when the second memory 150 works as the system memory 151B, the second memory 150 may be accessed at the granularity of a cache line (e.g., a 64-byte or 128-Byte cache line), at which a memory subsystem including the first memory 130 working as the external memory caches 131 and 135 and the system memory 151 accesses a memory. Thus, when the second

TABLE 2

| HANDSHAKING FIELD | SOURCE | DESTINATION | SIGNAL TYPE |
|---|---|---|---|
| 10 | PROCESSOR (170) | 2$^{ND}$ MEMORY UNIT | DATA REQUEST (READ COMMAND) |
| 11 | 2$^{ND}$ MEMORY UNIT | PROCESSOR (170) | DATA READY |
| 01 | PROCESSOR (170) | 2$^{ND}$ MEMORY UNIT | SESSION START |

As exemplified in table 2 the signals between the processor 170 and the second memory unit may include at least the data request signal ("DATA REQUEST (READ COMMAND)"), the data ready signal ("DATA READY"), and the session start signal ("SESSION START"), which have binary values "10", "11" and "01" of the handshaking information field, respectively.

The data request: signal may be provided from the processor 170 to the second memory unit, and may indicate a request of data stored in the second memory unit. Therefore, for example, the data request signal may include the read command and the read address as well as the handshaking information field having the value "10" indicating the second memory unit as the destination.

The data ready signal may be provided from the second memory unit to the processor 170 in response to the data request signal, and may have the handshaking information memory 150 is deployed as the system memory 151B within the memory sub-system, the second memory 150 may be accessed at the same level of granularity as the first memory 130 (e.g. the DRAM) included in the same memory subsystem. The coupling relationship between the second memory controller 311 and the second memory 150 of FIGS. 4 and 5 may not necessarily indicate particular physical bus or particular communication channel. In some embodiments, a common memory bus or other type of bus may be used to communicatively couple the second memory controller 311 to the second memory 150. For example, in an embodiment, the coupling relationship between the second memory controller 311 and the second memory 150 of FIG. 4 may represent a DDR-typed bus, over which the second memory controller 311 communicates with the second memory 150. The second memory controller 311 may also communicate with the second memory 150 over a bus supporting a native transactional protocol such as the PCIE bus, the DMI bus, or any other type of bus utilizing a transactional protocol and a small-enough transaction payload size (e.g., cache line size, such as 64 or 128 bytes).

Although not illustrated, the second memory controller 311 may further include a register. The register may temporarily store the requested data retrieved from the second memory 150 working as the system memory 151B in response to the data request signal from the processor 170. The second memory controller 311 may temporarily store the requested data retrieved from the second memory 150 working as the system memory 151B into the register and then provide the processor 170 with the data ready signal having the value "01" of the handshaking information field in response to the data request signal.

As an exemplified process of the two-level memory sub-system 400, the processor 170 including the memory cache controller 270 may provide the second memory controller 311 with the data request signal including the handshaking information field of the value "10" as well as the read command and the read address through the handshaking interface unit. In response to the data request signal, the second memory controller 311 may read out requested data from the second memory 150 working as the system memory 151B according to the read command and the read address included in the data request signal. The second memory controller 311 may temporarily store the read-out data into the register. The second memory controller 311 may provide the processor 170 with the data ready signal through the handshaking interface unit after the temporal storage of the read-out data into the register. In response to the data ready signal, the processor 170 may provide the second memory controller 311 with the session start signal including the handshaking information field of the value "01", and then receive the read-out data temporarily stored in the register.

As described above, in accordance with an embodiment of the present invention, the processor 170 may communicate with the second memory unit through the communication of the handshaking scheme and thus the processor 170 may perform another operation without stand-by until receiving requested data from the second memory unit.

When the processor 170 provides the second memory controller 311 with the data request signal through the handshaking interface unit, the processor 170 may perform another data communication with another device (e.g., the I/O device coupled to the bus coupling the processor 170 and the handshaking interface unit) until the second memory controller 311 provides the processor 170 with the data ready signal. Further, upon reception of the data ready signal provided from the second memory controller 311, the processor 170 may receive the read-out data temporarily stored in the register of the second memory controller 311 by providing the session start signal to the second memory controller 311 at any time the processor 170 requires the read-out data.

Therefore in accordance with an embodiment of the present invention, the processor 170 may perform another operation without stand-by until receiving requested data from the second memory unit thereby improving operation bandwidth thereof.

Figure 5:
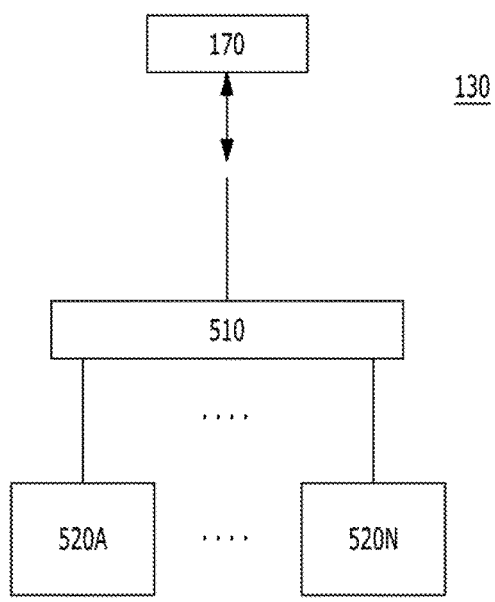
FIG. 5 is a block diagram illustrating a first memory of the two-level memory sub-system of FIG. 4.

FIG. 5 is a block diagram illustrating the first memory 130 of the two-level memory sub-system 400 of FIG. 4.

Referring to FIG. 5 the first memory 130 serving as the memory caches 131 and 135 may include a first memory management logic 510 and one or more first memory cores 520A to 520N. The first memory management logic 510 may be operatively coupled to the processor 170 through high bandwidth and low latency means.

The first memory cores 520A to 520N may be operatively coupled to one another in parallel. The parallel first memory cores 520A to 520N may be operatively coupled to the first memory management logic 510. The respective first memory cores 520A to 520N may be a volatile memory core suitable for high-capacity data caching operation, and may be the DRAM core. The respective first memory cores 520A to 520N may operate with high latency, high caching capacitance, low cost and small power consumption. The respective first memory cores 520A to 520N of the first memory 130 may operate with higher operation speed than the second memory 150. The memory cache controller 270 may control the respective first memory cores 520A to 520N.

The first memory management logic 510 may achieve a relatively high operation speed of the first memory 130 by compensating for the high latency of the respective first memory cores 520A to 520N. The first memory management logic 510 may support high-speed communication between the processor 170 and the first memory cores 520A to 520N.

The memory cache controller 270 may provide the first memory 130 serving as the memory caches 131 and 135 with a command, an address, a chip address, and a clock, and exchange data and a data strobe signal with the first memory 130.

The command may include a chip select signal, an active signal a row address strobe signal, a column address strobe signal, a write enable signal, a clock enable signal and the like. Examples of the operations which the memory cache controller 270 instructs the first memory management logic 510 to perform through the command may include an active operation, a read operation, a write operation, a precharge operation, a refresh operation, and the like. The chip address may designate one or more memory cores to be accessed or to perform a read or write operation among the first memory cores 520A to 520N, and the address may designate the location of a memory cell to be accessed inside the selected memory core. The clock may be supplied to the first memory 130 from the memory cache controller 270 for the synchronized operation of the first memory management logic 510 and the first memory cores 520A to 520N. The data strobe signal for strobing the data may be transmitted to the first memory 130 from the memory cache controller 270 during a write operation, and transmitted to the memory cache controller 270 from the first memory 130 during a read operation. That is, the transmission directions of the data strobe signal and the data may be the same as each other. The clock and the data strobe signal may be transmitted in a differential manner.

The first memory management logic 510 and the first memory cores 520A to 520N may be stacked in the first memory 130, and signal transmission among the first memory management logic 510 and the first memory cores 520A to 520N may be performed through interlayer channels. The interlayer channel may be implemented with a through-silicon via (TSV). The memory cache controller 270 and the first memory 130 may directly communicate with each other by using the first memory management logic 510, and the first memory cores 520A to 520N may indirectly communicate with the memory cache controller 270 through the first memory management logic 510. That is, the signal channels (i.e., the command, address, chip address, clock, data and data strobe signal) between the memory cache controller 270 and the first memory 130 may be connected only to the first memory management logic 510.

During a write operation, write data transmitted to the first memory 130 may be serial-to-parallel converted and then stored in a memory cell of one or more selected among the first memory cores 520A to 520N. The write data may be processed by the first memory management logic 510 and then transferred to the selected memory cores. During a read operation, data read from one or more selected among the first memory cores 520A to 530N may be parallel-to-serial converted and then transferred to the memory cache controller 270. The read data may be processed by the first memory management logic 510 and then transferred to the memory cache controller 270. That is, during the write and read operations, the operations of processing data, that is, the serial-to-parallel conversion and the parallel-to-serial conversion may be performed by the first memory management logic 510.

Figure 6:
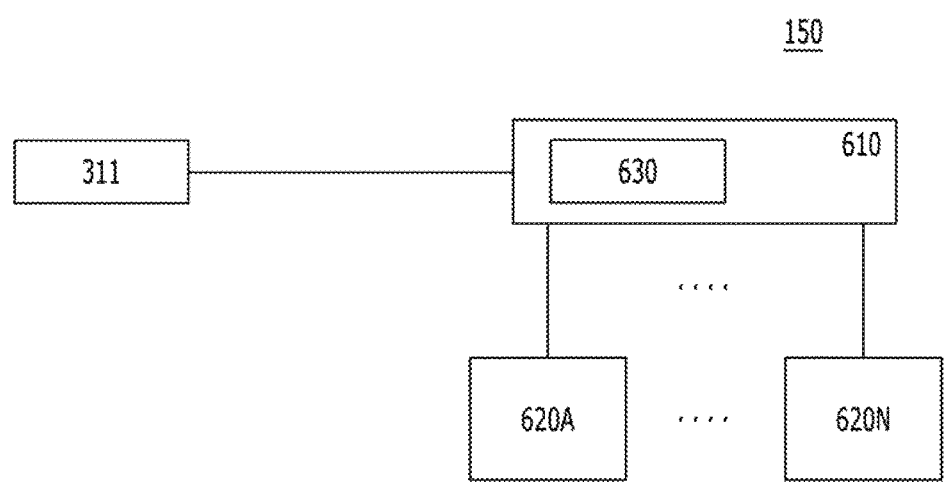
FIG. 6 is a block diagram illustrating a second memory of the two-level memory sub-system of FIG. 4.

FIG. 6 is a block diagram illustrating the second memory 150 of the two-level memory sub-system 400 of FIG. 4.

Referring to FIG. 6, the second memory 150 serving as the system memory 151B may include a second memory management logic 610 and one or more second memory cores 620A to 620N. The second memory management logic 610 may be operatively coupled to the second memory controller 311 through high bandwidth and low latency means.

The second memory cores 620A to 620N may be operatively coupled to one another in parallel. The parallel second memory cores 620A to 620N may be operatively coupled the second memory management logic 610. The respective second memory cores 620A to 620N may be a non-volatile memory core, and may be one or more of the NAND flash memory core, the NOR flash memory core, and the non-volatile random access memory (NVRAM) core. The respective second memory cores 620A to 620N may work as instruction and data storage that is addressable by the processor 170 either directly or via the first memory 130. The respective second memory cores 620A to 620N may keep pace with the processor 170 at least to a sufficient extent in contrast to the mass storage 251B. The respective second memory cores 620A to 620N may be placed on the memory bus, and may communicate directly with the second memory controller 311 and the processor 170. The respective second memory cores 620A to 620N may operate with high latency, high caching capacitance, low cost and small power consumption. The respective second memory cores 620A to 620N of the second memory 150 may operate with lower operation speed than a high-speed operation memory such as the first memory 130. The second memory controller 311 may control the respective second memory cores 620A to 620N.

The second memory management logic 610 may achieve a relatively high operation speed of the second memory 150 by compensating for the high latency of the respective second memory cores 620A to 620N. The second memory management logic 610 may support high-speed communication between the processor 170 and the second memory cores 620A to 620N.

The second memory controller 311 may provide the second memory 150 serving as the system memory 151B with a command, an address, a chip address and a dock, and exchange data and a data strobe signal with the second memory 150.

The second memory management logic 610 and the second memory cores 620A to 620N may be stacked in the, second memory 150, and signal transmission among the second memory management logic 610 and the second memory cores 620A to 620N may be performed through interlayer channels. The interlayer channel may be implemented with a through-silicon via (TSV). The second memory controller 311 and the second memory 150 may directly communicate with each other by using the second memory management logic 610, and the second memory cores 620A to 620N may indirectly communicate with the second memory controller 311 through the second memory management logic 610. That is, the signal channels (i.e., command, address, chip address, clock, data and data strobe signal) between the second memory controller 311 and the second memory 150 may be connected only to the second memory management logic 610.

During a write operation, write data transmitted to the second memory 150 may be serial-to-parallel converted and then stored in a memory cell of one or more selected among the second memory cores 620A to 620N. The write data may be processed by the second memory management logic 610 and then transferred to the selected memory cores. During a read operation, data read from one or more selected among the second memory cores 620A to 620N may be parallel-to-serial converted and then transferred to the second memory controller 311. The read data may be processed by the second memory management logic 610 and then transferred to the second memory controller 311. The second memory management logic 610 may include a buffer 630.

According to an embodiment of the present invention, in the write-through mode of the first memory 130 working as the memory caches 131 and 135, the buffer 630 may secure the update time of the second memory cores 620A to 620N.

The buffer 630 may have a predetermined buffering capacity and may operate according to the first-in-first-out (FIFO) scheme, and thus may buffer the write data at the same speed as the first memory 130 working as the memory caches 131 and 135 stores therein the write data. The buffer 630 may additionally include a register for enlarged buffering size in order to prevent a stall due to a burst write operation After the buffer 630 buffers therein the write data to be updated, the second memory cores 620A to 620N may perform the update operation based on the write data sequentially buffered in the buffer 630 through the second memory management logic 610.

Upon cache hit in the write-through mode of the first memory 130 working as the memory caches 131 and 135 during the write operation, the processor 170 may cache the cache-hit write data in the first memory 130 working as the memory caches 131 and 135 without consideration of the latency of the second memory 150 working as the system memory 151B. Further, the second memory controller 311 may buffer the write data in the buffer 630 according to the FIFO scheme. During the buffering operation, the second memory controller 311 may buffer the write data in the buffer 630 substantially at the same speed as caching of the write data in the first memory 130 working as the memory caches 131 and 135. Then, the second memory management logic 610 may update the second memory cores 620A to 620N based on the write data buffered in the buffer 630 when the buffer 630 is full of the write data or the two-level memory sub-system 400 is in an idle state.

Upon cache miss in the write-through mode of the first memory 130 working as the memory caches 131 and 135 during the write operation, the second memory controller 311 may buffer the cache-missed write data in the buffer 630 according to the FIFO scheme without caching the cache-missed write data in the first memory 130 working as the memory caches 131 and 135. Then, the second memory management logic 610 may update the second memory cores 620A to 620N based on the write data buffered in the buffer 630 when the buffer 630 is full of the write data or the two-level memory sub-system 400 is in an idle state.

In an embodiment, the second memory controller 311 and the second memory management logic 610 may receive from the processor 170 the write data and then transfer the write data without modification to the second memory cores 620A to 620N. For example, upon receiving a stream of the write data including plural segments from outside (e.g., an external source) the memory system including the processor 170, the second memory controller 311 and the two-level memory sub-system 400, the second memory controller 311 may buffer the write data in the buffer 630 and the second memory management logic 610 may update the second memory cores 620A to 620N when needed.

It is not when the write data is updated in the second memory cores 620A to 620N but when the write data is buffered in the buffer 630 that a signal indicating storage of the write data in the second memory cores 620A to 620N is returned to the outside. Therefore, the time required to store the provided write data in the second memory cores 620A to 620N may be reduced, and subsequent write data may be provided faster from the outside.

Subsequent write data may be provided from the outside without waiting for storage completion of previous write data into the second memory cores 620A to 620N. Through the second memory controller 311 and the second memory management logic 610, the processor 170 may provide a second portion of the write data from the outside to the write buffer 501 at the same time that the processor 170 is providing a first portion of the write data from the buffer 630 to the second memory cores 620A to 620N. Hence, the buffer 630 may allow effective storage of write data provided from the outside to the second memory cores 620A to 620N.

For example, 8 segments (e.g. first to eighth segments) of the write data may be buffered sequentially in the buffer 630 before stored in the second memory cores 620A to 620N, which is faster than directly storing them in the second memory cores 620A to 620N. Instead of waiting for storage completion of the first segment of the write data into the second memory cores 620A to 620N, a signal may be returned to indicate that the first segment of the write data is stored in the second memory cores 620A to 620N and the second segment of the write data is to be provided. Such process may be repeated until all of the 8 segments of the write data are buffered in the buffer 630 while in a parallel way the 8 segments of the write data buffered in the buffer 630 are stored in the second memory cores 620A to 620N.

For example, the previously buffered segments of the write data may be stored in the second memory cores 620A to 620N while the currently provided segments of the write data are buffered in the buffer 630.

The sequential segments of the write data are sequentially provided to and buffered in the buffer 630 while the sequential segments of the write data buffered in the buffer 630 may be individually provided to and stored in the second memory cores 620A to 620N. The sequential segments of subsequent write data are sequentially provided to and buffered in the buffer 630 while in a parallel way the sequential segments of previous write data buffered in the buffer 630 may be provided to and stored in the second memory cores 620A to 620N.

The amount of time for buffering the provided write data in the buffer 630 may be smaller than the amount of time for storing the buffered write data in the second memory cores 620A to 620N.

In an embodiment, non-sequential data segments of a plurality of individual write data may be preferentially buffered in the buffer 630. For example, a non-sequential data segment 7 may be promptly stored in the second memory cores 620A to 620N through the buffer 630 upon being provided from the outside. While the non-sequential data segment 7 is being buffered in the buffer 630, subsequent and non-sequential data segments 8 to 16 may be provided from the outside.

The subsequent and non-sequential data segments 8 to 16 may be stored in the second memory cores 620A to 620N after the previous non-sequential data segment 7 is stored in the second memory cores 620A to 620N.

Consequentially, the performance of the memory system including the two-level memory sub-system 400 may be improved by the buffer 630 during the write operation regardless of the cache hit or cache miss. During the write operation, the write data may be preferably buffered in the buffer 630 and then the second memory cores 620A to 620N may be updated according to the write data buffered in the buffer 630 regardless of the cache hit or cache miss, While the present invention has been described with respect to the specific embodiments, it will be apparent to those skilled in the art that various changes and modifications may be made without departing from the spirit and or scope of the invention as defined in the following claims.

What is claimed is:

1. A memory system comprising:
   a first memory device including a first memory and a first memory controller configured to control the first memory to store data;
   a second memory device including a second memory and a second memory controller configured to control the second memory to store data; and
   a processor is configured to execute an operating system (OS) and an application to access a data storage memory through the first and second memory devices,
   wherein the first and second memories are separated from the processor,
   wherein the second memory controller transfers a signal between the processor and the second memory device based on at least one of values of a handshaking information field included in the signal,
   wherein the first memory includes a plurality of first high-capacity memory cores configured to work as cache memories for the second memory,
   wherein the first memory device further includes a first memory management logic operatively and commonly coupled with the plurality of first high-capacity memory cores, and configured to support high-speed data communication between the processor and the plurality of first high-capacity memory cores,
   wherein the second memory includes a plurality of second high-capacity memory cores configured to work as system memories,
   wherein the second memory device further includes a second memory management logic operatively and commonly coupled with the plurality of second high-capacity memory cores, and configured to support data communication between the processor and the plurality of second high-capacity memory cores,
   wherein the second memory management logic includes a buffer configured to buffer write data, based on which the plurality of second memory cores are updated,
   wherein the second memory controller firstly buffers the write data in the buffer, and then the second memory management logic independently updates the plurality of second memory cores based on the buffered write data, and wherein the at least one of values of the handshaking information field indicates the signal as one of a data request signal from the processor to the second memory, a data ready signal from the second memory to the processor and a session start signal from the processor to the second memory.

2. The memory system of claim 1, wherein the second memory controller includes:
 a handshaking interface configured to transfer the signal between the second memory device and the processor; and
 a register configured to temporarily store data read out from the second memory.

3. The memory system of claim 1, wherein the data request signal includes a command and an address for the second memory device.

4. The memory system of claim 1,
 wherein the second memory controller includes a storage unit, and
 wherein the second memory controller reads data from the second memory and temporarily stores the read data in the storage unit in response to the data request signal.

5. The memory system of claim 4, wherein the second memory controller provides the data ready signal to the processor when the second memory controller temporarily stores the read data in the storage unit in response to the data request signal.

6. The memory system of claim 5, wherein the processor provides the session start signal to receive the read data temporarily stored in the storage unit in response to the data ready signal.

7. The memory system of claim 1, wherein the first memory device is a volatile memory device.

8. The memory system of claim 1, wherein the second memory device is a nonvolatile memory device.

9. The memory system of claim 8, wherein the nonvolatile memory device is a nonvolatile random access memory device.

10. A memory system comprising:
 a first memory device including a first memory and a first memory controller configured to control the first memory to store data;
 a second memory device including a second memory and a second memory controller configured to control the second memory to store data; and
a processor configured to access the first and second memories, wherein the second memory controller transfers a signal between the processor and the second memory device based on at least one of values of a handshaking information field included in the signal,
 wherein the first memory includes a plurality of first high-capacity memory cores configured to work as cache memories for the second memory,
 wherein the first memory device further includes a first memory management logic operatively and commonly coupled with the plurality of first high-capacity memory cores, and configured to support high-speed data communication between the processor and the plurality of first high-capacity memory cores,
 wherein the second memory includes a plurality of second high-capacity memory cores configured to work as system memories,
wherein the second memory device further includes a second memory management logic operatively and commonly coupled with the plurality of second high-capacity memory cores, and configured to support data communication between the processor and the plurality of second high-capacity memory cores,
 wherein the second memory management logic includes a buffer configured to buffer write data, based on which the plurality of second memory cores are updated,
 wherein the second memory controller firstly buffers the write data in the buffer, and then second memory management logic independently updates the plurality of second memory cores based on the buffered write data, and
 wherein the at least one of values of the handshaking information field indicates the signal as one of a data request signal from the processor to the second memory, a data ready signal from the second memory to the processor and a session start signal from the processor to the second memory.

11. The memory system of claim 10, wherein the second memory controller includes:
 a handshaking interface configured to transfer the signal between the second memory device and the processor; and
 a register configured to temporarily store data read out from the second memory.

12. The memory system of claim 11, wherein the data request signal includes a command and an address for the second memory device.

13. The memory system of claim 11,
 wherein the second memory controller includes a storage unit, and
 wherein the second memory controller reads data from the second memory and temporarily stores the read data in the storage unit in response to the data request signal.

14. The memory system of claim 13, wherein the second memory controller provides the data ready signal to the processor when the second memory controller temporarily stores the read data in the storage unit in response to the data request signal.

15. The memory system of claim 14, wherein the processor provides the session start signal to receive the read data temporarily stored in the storage unit in response to the data ready signal.

16. The memory system of claim 10, wherein the first memory device is a volatile memory device.

17. The memory system of claim 10, wherein the second memory device is a nonvolatile memory device.

18. The memory system of claim 17, wherein the nonvolatile memory device is a nonvolatile random access memory device.

* * * * *